United States Patent

Sato

[15] 3,641,374
[45] Feb. 8, 1972

[54] RECTIFYING MEANS FOR THREE-PHASE ALTERNATING GENERATORS FOR USE IN VEHICLES AND OTHER TRANSPORT FACILITIES

[72] Inventor: Suguru Sato, Kariya, Japan
[73] Assignee: Nippondenso Kabushiki Kaisha, Kariya-shi, Aichi-ken, Japan
[22] Filed: Jan. 27, 1971
[21] Appl. No.: 110,044

[30] Foreign Application Priority Data

Mar. 11, 1970 Japan..................................45/23542

[52] U.S. Cl..........................................310/68 D, 317/234 A
[51] Int. Cl..........................................................H02k 11/00
[58] Field of Search..............310/68 D; 321/8 C; 317/234 A, 317/234 E

[56] References Cited

UNITED STATES PATENTS 2,722,652  11/1955  Brainard...............................310/68 D
3,486,083  12/1969  Takada................................317/234 A

FOREIGN PATENTS OR APPLICATIONS 1,290,186  3/1962  France................................310/68 D Primary Examiner—D. X. Sliney
Attorney—Cushman, Darby & Cushman

[57] ABSTRACT

An extremely compact rectifying means capable of providing increased power is provided, which comprises rectifying elements sealed between a printed wiring plate having a neutral lead line and cooling fins, and in which two additional rectifying elements connected to the neutral point are sealed in addition to the conventional six rectifying elements.

1 Claims, 5 Drawing Figures

RECTIFYING MEANS FOR THREE-PHASE ALTERNATING GENERATORS FOR USE IN VEHICLES AND OTHER TRANSPORT FACILITIES

BACKGROUND OF THE INVENTION

1. Field of the Invention

This invention relates to the construction of rectifying means for alternating generators for use in vehicles and other transport facilities and, more particularly, to a rectifying means consisting of eight rectifying elements.

2. Description of the Prior Art

The generators used in vehicles and the like are usually three-phase alternating generators. The three-phase AC output power produced in the induction windings of the generator is usually full-wave rectified by a rectifying means built in the generator and consisting of six rectifying elements to produce DC powder supplied to a battery or other vehicle loads. The usual full-wave rectification of the three-phase AC output appearing at the live terminals of the induction windings to derive the DC output is still not sufficiently effective.

It is disclosed in Japanese Patent Publication No. 4451/1969 that increased DC power can be derived by rectifying the potential variation at the neutral point of the induction windings of the generator through additional rectifying elements connected to the neutral point for addition to the DC output across the output terminals. To this end, two additional rectifying elements are required, one rectifying element connected between the neutral point and the positive output terminal and the other connected between the neutral point and the negative output terminal, in addition to the six rectifying elements in the usual three-phase full-wave rectifying circuit. In other words, a total of eight rectifying elements are required to construct the rectifying circuit. With eight rectifying elements involved in such rectifying means, however, the wiring of these elements tends to be complicated, as well as increasing the space factor. The prior art construction of this type of rectifying means has been impractical for such mass production type units as those used in vehicles, for which smallness in size and lightness in weight are desired.

SUMMARY OF THE INVENTION

An object of the invention is to overcome the above drawbacks by the provision of an extremely compact rectifying means capable of providing increased power, which comprises rectifying elements sealed between a printed wiring plate having a neutral lead and cooling fins, and in which two additional rectifying elements connected to the neutral point are sealed together with the conventional six rectifying elements.

The construction according to the invention, which comprises 8 rectifying elements, two for rectifying the potential variation at the neutral point to effectively derive additional DC power to thereby increase the rectified generator output, features that all the rectifying elements are sealed between a printed wiring plate and cooling fins and that the two additional rectifying elements connected to a neutral lead formed in the printed circuit plate are sealed together with the conventional six rectifying elements, so that the construction of the entire rectifying means can be made extremely compact. Thus, a great practical benefit is afforded in that it is possible to provide a small-size, lightweight, rigid and inexpensive construction of the eight-element type three-phase rectifying means, which has heretofore been difficult to realize because of complications in the wiring in spite of the capability of effectively utilizing the neutral point of voltage variation.

DESCRIPTION OF THE PREFERRED EMBODIMENT

Figure 1:
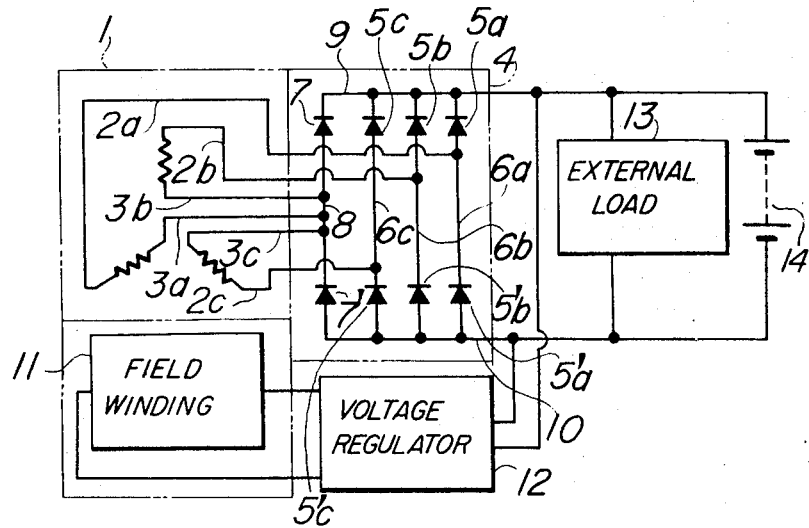
FIG. 1 is a connection diagram showing a three-phase generator provided with a rectifying means according to the invention.
Figure 2:
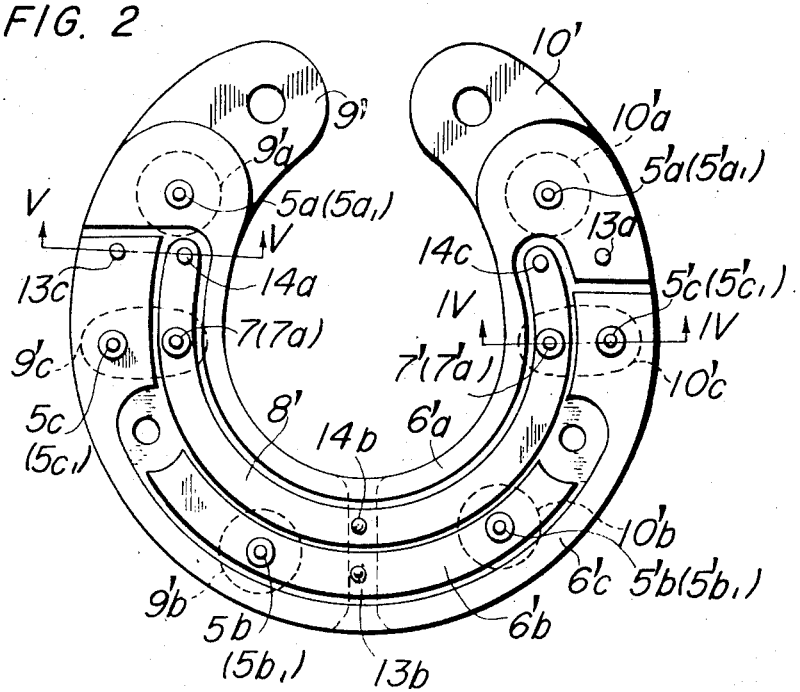
FIG. 2 is a plan view of a rectifying means embodying the invention.
Figure 3:
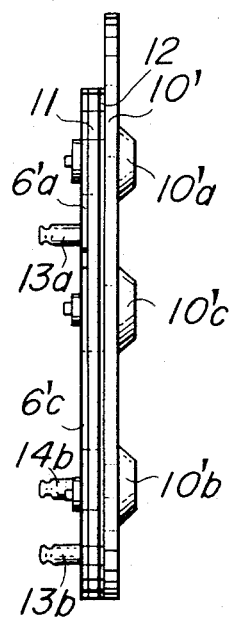
FIG. 3 is a side view of the rectifying means of FIG. 2.
Figure 4:
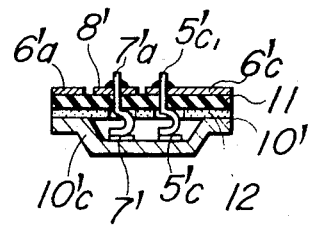
FIG. 4 is a section taken along line IV—IV of FIG. 2.

Referring now to FIG. 1, reference numeral 1 generally designates induction windings of a three-phase star-connected generator. These windings have "live" or AC output take-out leads 2a, 2b and 2c and neutral leads 3a, 3b and 3c respectively. Numeral 4 generally designates a rectifying means according to the invention. It comprises main rectifying elements 5a, 5b, 5c, 5'a, 5'b and 5'c to rectify the three-phase AC output. The rectifying elements 5a, 5b and 5c are connected through respective leads 6a, 6b and 6c to the associated elements 5'a, 5'b and 5'c. The rectifying means according to the invention also comprises two additional rectifying elements 7 and 7' connected to each other through a lead 8, to which the neutral leads 3a, 3b and 3c are also connected. The rectifying elements 5a, 5b, 5c and 7 are commonly connected to a positive output line 9, while the rectifying elements 5'a, 5'b, 5'c and 7' are commonly connected to a negative output line 10. Numeral 11 designates the field winding of the generator, numeral 12 a voltage regulator, numeral 13 an external load, and numeral 14 a battery.

Figure 5:
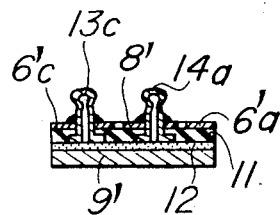
FIG. 5 is a section taken along line V—V of FIG. 2.

FIGS. 2 to 5 show a mechanical construction of the rectifying means of the above circuit construction according to the invention. It comprises a horseshoe-shaped arrangement having arcuate cooling fins 9' and 10'. The cooling fin 9' serves to cool rectifying elements 5a, 5b, 5c and 7, while the cooling fin 10' serves to cool rectifying elements 5'a, 5'b, 5'c and 7'. These cooling fins 9' and 10' respectively constitute the positive and negative output lines 9 and 10 as mentioned earlier. The leads between the respective rectifying element pairs are provided in the form of a printed circuit. A lead 6'a connects the rectifying elements 5a and 5'a, a lead 6'b connects the rectifying elements 5b and 5'b, a lead 6'c connects the rectifying elements 5c and 5'c, and a lead 8' connects the rectifying elements 7 and 7' and also serves as the neutral point. These leads overlie a horseshoe-shaped printed circuit base 11 of an insulating material. The base 11 is bonded to the cooling fins 9' and 10' by means of an adhesive as indicated at 12. Terminal pins 13a, 13b and 13c serve to electrically connect the respective leads 6'a, 6'b and 6'c to the corresponding AC output take-out leads 2a, 2b and 2c of the induction windings 1. Terminal pins 14a, 14b and 14c serve to electrically connect the lead 8' to the respective neutral leads 3a, 3b and 3c of the induction windings 1. As shown in FIG. 5, each of these terminal pins is soldered to the corresponding lead in the printed circuit and is firmly secured to the base 11, with its flanged stem embedded in the base 11.

The cooling fins 9' and 10', which also serve as the respective positive and negative output lines 9 and 10, are each formed with three rectifying element accommodating sections, two sections 9'a and 9'b or 10'a and 10'b being circular and the remaining one 9'c or 10'c being oval. In the circular sections 9'a, 9'b, 10'a and 10'b are accommodated the respective main rectifying elements 5a, 5b, 5'a and 5'b, while in the oval sections 9'c and 10'c are accommodated the main rectifying elements 5c and 5'c and the additional rectifying elements 7 and 7' in respective pairs. The rectifying elements 5a, 5'a, 5b, 5'b, 5c, 5'c, 7 and 7' are provided with respective terminals $5a_1$, $5'a_1$, $5b_1$, $5'b_1$, $5c_1$, $5'c_1$, $7a$ and $7'a$ respectively soldered to the corresponding leads 6'a, 6'b, 6'c and 8' of the printed circuit, and they are sealed in the respective accommodating sections as the cooling fins 9' and 10' are secured to the adhesive layer 12, as typically shown in FIG. 4.

In the construction described above, the printed circuit and the insulating printed circuit base constitutes the so-called printed wiring plate. In accordance with the invention, however, the term "printed wiring plate" covers not only a usual printed wiring plate, in which the printed circuit is formed by selectively etching a thin conducting layer applied on an insulating substrate, but also a wiring plate, which is formed by applying a stamped conducting sheet having a predetermined pattern on an insulating substrate.

I claim:

1. A rectifying means for three-phase alternating generators for use in vehicles and other transport facilities comprising a rectifying element cooling means, a printed wiring plate secured over said cooling means, main rectifying elements to rectify the three-phase alternating generator output, said rectifying elements being sealed between said cooling means and said printed wiring plate, said printed wiring plate including a lead constituting the neutral point of the generator induction windings, and additional rectifying elements to rectify the potential variation at the neutral point so as to produce additional DC output, said additional rectifying elements being also sealed between said cooling means and said printed wiring plate.

* * * * *